July 15, 1941.    P. SCHLACK    2,249,177
REARRANGEMENT REACTION OF OXIMES
Filed Nov. 27, 1939
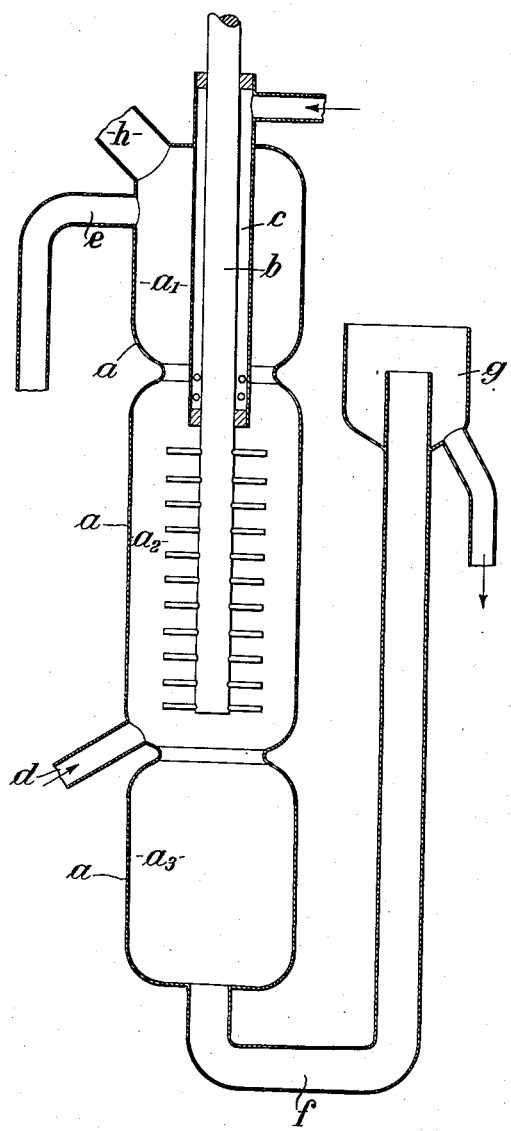
Inventor
Paul Schlack
By His Attorneys Patented July 15, 1941

2,249,177

UNITED STATES PATENT OFFICE 2,249,177

REARRANGEMENT REACTION OF OXIMES

Paul Schlack, Berlin-Treptow, Germany, assignor to I. G. Farbenindustrie Aktiengesellschaft, Frankfort-on-the-Main, Germany Application November 27, 1939, Serial No. 306,428
In Germany November 28, 1938

5 Claims. (Cl. 260—239)

The present invention relates to the rearrangement of ketoximes.

The Beckmann's rearrangement of ketoximes, especially the rearrangement of cyclic ketoximes, for instance the oximes of cyclopentanone, cyclohexanone, methylcyclohexanone, cycloheptanone, etc., into cyclic lactams having an enlarged ring is generally carried out in strong sulfuric acid on a laboratory scale. In carrying out the reaction in larger batches a great many difficulties occur.

It is an object of the invention to provide a process of producing in an economical and safe manner sulfuric acid solutions of oximes designed for rearrangement reactions. Dissolution of the oximes in the strong sulfuric acid necessary for rearrangement, for instance sulfuric acid of 85 per cent, causes strong heat development, and the reaction may go explosively unless the heat of reaction is rapidly dissipated by cooling. Especially if the oxime is still moist with water, as it is obtained by synthesis, the danger of undue heat development is very great. The oxime must therefore be well dried before dissolution. Since, however, the oximes are as a rule volatile and the solid oximes tend to sublime, losses may easily occur. Therefore it is necessary to work very carefully, for instance in vacuum desiccators.

I have found that the danger of the reaction starting spontaneously is entirely prevented by dissolving the oxime preferably in a low boiling solvent which is inert to strong sulfuric acid, for instance, methylene chloride, propyl chloride, chloroform, dichloroethylene, ethylene chloride, carbon tetrachloride, difluorodichloroethane, B. P. 58° to 60° C., or butyl fluoride. The solvent may be removed entirely or partly during or after the mixing step. The temperature at which the solution is effected can be kept under control and, in any case, it does not rise substantially above the boiling point of the solvent used at the prevailing pressure.

In selecting the solvent regard must be had, at a given pressure, to the questions of economical solvent recovery and corrosion and, still more important, to the reactivity of the ketoxime which is to be subjected to rearrangement. In the series of the cyclic ketoximes cyclohexanone oxime is very reactive, so that in this case the rearrangement may start spontaneously at relatively low temperatures while alkylated products, for instance methylcyclohexanoneoxime or ketoximes of the hydronaphthalene series, react more slowly. In the case of cyclohexanoneoxime solvents of low boiling point such as methylene chloride, 1- or 2-propyl chloride will be preferred.

In some cases it is advantageous to employ non-volatile solvents which can be easily separated from sulfuric acid, for instance chlorinated hydrocarbons of high boiling point. These are especially useful in a continuous process. In this case the formation of lumps which can occur in working with solid oximes, which may cause local overheating, is prevented with certainty. In producing the solution of oxime in the indifferent solvent it is possible to employ pure, dry, solid or liquid oxime. The invention is, however, still more advantageous if moist crude oxime is taken up in the solvent or, if the oxime is already extracted, during or at the end of the reaction leading to the oxime if aqueous hydroxylamine or hydroxylamine salt solutions are employed. It is as a rule unnecessary to dry the solution after it has been freed from suspended water; the drying can, however, be easily carried out by azeotropic distillation or by a rapidly acting drying agent such as silica gel or potassium carbonate.

It is of advantage to mix the primary oxime solution with the strong acid in a continuous stream and either to remove the solvent by evacuating during this step or to lead the mixture through an evacuated vessel with preferably large surface. The mixing can also be carried out continuously in a separating vessel, to which the acid and the oxime solution flow in even streams. A vessel of this kind is described in diagram in the single figure attached to this specification. Referring to the figure, $a$ is the mixing vessel divided by three narrow parts $a_1$, $a_2$ and $a_3$. In part $a_2$ the sulfuric acid enters continuously through the tube $c$ which is adapted to take up the stirrer $b$, while the solution of oxime in a low boiling solvent enters through $d$ into the stirring vessel. The separated solvent leaves the apparatus through the pipe $e$ while the sulfuric acid containing the oxime is led through $a_3$ where it is no longer stirred and through the rising tube $f$ to the overflow tube $g$. The tube $h$ provides the connection with the cooled safety tube (not shown). The entire apparatus is cooled from without.

The invention is illustrated by the following examples:

*Example 1*

A solution obtained by dissolving one part of cyclohexanoneoxime in the moist state, in which it is obtained by filtering, in two parts of methylenechloride is sucked into a vacuum vessel after separating the aqueous phase in a centrifuge and subsequent drying with potassium carbonate. In the vacuum vessel there are two parts of sulfuric acid of 90 per cent strength. The methylene chloride solution enters at the bottom of the vessel through a glass frit. The methylene chloride vapors distilling off at a slight pressure are liquefied by cooling. The parts which are not condensed are kept back by a carbon filter. When the dissolution is complete, the last remnants of the solvent are removed by a stream of air. The sulfuric acid solution is then led to the vessel in which the rearrangement is effected. If instead of cyclohexanoneoxime, 3-methylcyclohexanoneoxime is employed, n-butyl chloride or ethylene chloride can be used as solvents. In this manner highly concentrated solutions can be produced.

*Example 2*

90 kilos of a solution of cyclohexanoneoxime in methylene chloride (33 per cent) and 60 kilos of sulfuric acid (98 per cent) are mixed in a cooled stirring vessel. The methylene chloride enters below the sulfuric acid. The oxime is dissolved by the sulfuric acid and the methylene chloride overflows continuously above the sulfuric acid while the oxime solution in sulfuric acid leaves the vessel at the bottom (see also the figure).

I claim:

1. A method of producing solutions of cycloalkanone oximes in strong sulfuric acid, which method comprises mixing with sulfuric acid a solution of a cycloalkanone oxime in an organic solvent indifferent to sulfuric acid and removing said solvent.

2. A method of continuously carrying out Beckmann's rearrangement reaction of cycloalkanone oximes, which comprises continuously dissolving a cycloalkanone oxime moist with water in an organic solvent of low boiling point and indifferent to concentrated sulfuric acid, continuously mixing the solution with sulfuric acid, removing the organic solvent and heating the mixture to cause rearrangement of the oxime.

3. The process in accordance with claim 2 characterized in that the cycloalkanone oxime is cyclohexanone oxime.

4. The process in accordance with claim 2 characterized in that the low boiling solvent is methylene chloride.

5. A method of continuously carrying out Beckmann's rearrangement reaction of cyclohexanone oxime which comprises continuously dissolving cyclohexanone oxime moist with water in methylene chloride, continuously mixing the solution with sulfuric acid, removing the methylene chloride, and heating the mixture to cause rearrangement of the oxime.

PAUL SCHLACK.